UNITED STATES PATENT OFFICE.

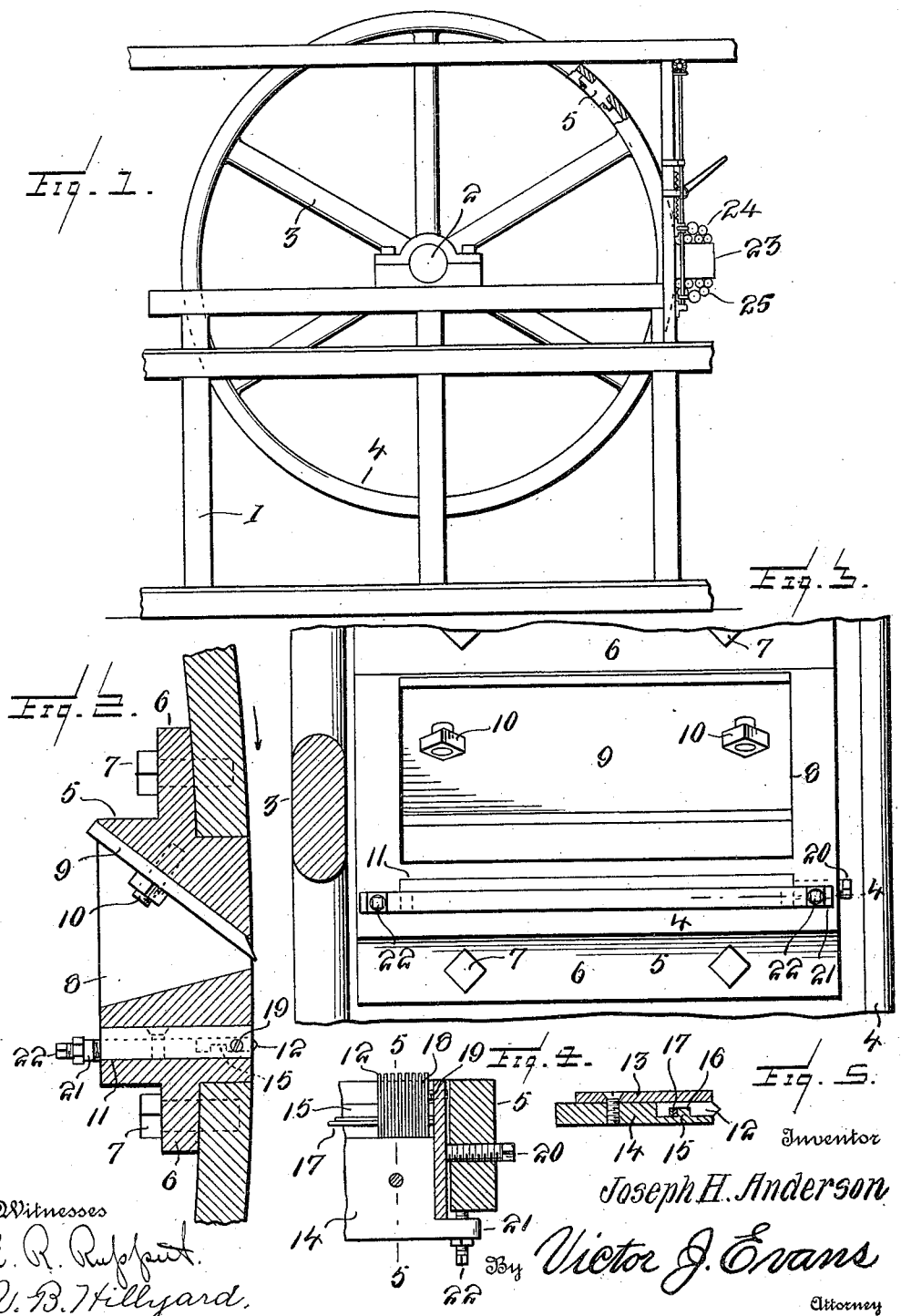

JOSEPH H. ANDERSON, OF CONNELLSVILLE, PENNSYLVANIA.

EXCELSIOR-MACHINE.

1,052,994.  Specification of Letters Patent.  Patented Feb. 11, 1913.

Application filed February 7, 1911. Serial No. 607,046.

*To all whom it may concern:*

Be it known that I, JOSEPH H. ANDERSON, a citizen of the United States, residing at Connellsville, in the county of Fayette and State of Pennsylvania, have invented new and useful Improvements in Excelsior-Machines, of which the following is a specification.

The purpose of this invention is the provision of a machine for cutting wood into fine shavings, excelsior, involving novel structural features, particularly in the formation of the cutting mechanism and the construction of the block holding and feeding devices, whereby the latter are adjustable and positive and certain in action.

The invention also contemplates a rotary cutter of such relative diameter as to practically make a straight cut and sever the shavings in lines parallel with the fibers of the wood or material so as to produce an article which will possess a degree of resistance to packing and remain loose and light for a comparatively great length of time.

The invention consists of the novel features, details of construction and combination of parts, which hereinafter will be more particularly set forth, illustrated in the accompanying drawings, and pointed out in the appended claim.

Referring to the drawings, forming a part of the application, Figure 1 is a side view of a machine embodying the invention, a portion of the rim of the rotary cutter being broken away to show the relative position of the cutting mechanism. Fig. 2 is a sectional view of the cutting mechanism and a part of the rim of the cutter. Fig. 3 is a top plan view of the parts shown in Fig. 2. Fig. 4 is a sectional detail of a portion of the rotary cutter on the line 4—4 of Fig. 3. Fig. 5 is a transverse section on the line 5—5 of Fig. 4.

Corresponding and like parts are referred to in the following description, and indicated in all the views of the drawings, by the same reference characters.

The framework for supporting the working parts is designated by the numeral 1 and may be of any construction best adapted for the purpose and comprises uprights and longitudinal and transverse timbers.

The rotary cutter comprises a shaft 2, arms 3 radiating from the shaft and a circular rim 4 secured to the outer ends of the arms 3. The circular rim 4 is substantially of U-form in cross section and projects from the plane of the arms 3 so that the cutting mechanism may be unobstructed. One or more openings are formed in the rim 4 and receive the cutting mechanism. The parts 2, 3 and 4 constitute a rotary head or support which is of comparatively large diameter approximately twenty to twenty-five feet across. The rotary head may be driven in any manner.

The cutting mechanism embodies a block or holder 5, which has outer extensions 6 in which openings are formed to receive machine screws or fastenings 7 by means of which the block or holder is secured to the rim of the rotary head. A portion of the block or holder extends through the opening formed in the rim 4 so as to come flush with the outer surface of said rim. An opening 8 is formed in the block or holder 5 and its front and rear walls flare inwardly, one of the walls constituting a seat for a bit 9, which consists of a broad flat blade secured upon its seat by suitable fastenings 10. The blade 9 is arranged to have its cutting edge project slightly beyond the outer surface of the block and rotary head so as to cut a shaving of the required thickness from the block.

The block is scored in advance of the operation of the cutter 9, the scoring mechanism being fitted into an opening 11 formed in an end portion of the block or holder 5. The scoring mechanism comprises a series of spaced cutters 12 and a holder therefor, which comprises plates 13 and 14 between which the cutters 12 are secured. One of the plates, as 14, has a portion rabbeted or cut away a distance corresponding to the width of the cutters 12 so as to receive said cutters. A rib 15 projecting from the rabbeted portion of the plate 14 enters recesses 16 formed in an edge of the cutters 12. A series of shims 17 are fitted into an end portion of the recesses 16 and to one side of the rib 15, whereby provision is had for adjusting the cutters 12 as the latter are worn. As the cutters 12 are worn away they are moved outward, provision being had for such adjustment by removing one of the shims 17 from the inner ends of the recesses 16 and replacing same within the outer ends of the recesses 16, as will be readily understood. The combined thickness of the rib 15 and the shims 17 corresponds to the length of the recesses 16 and when it is required to move the cutters 12 outward one of the shims 17 is shifted from the inner side of the rib 15 to the outer side thereof. The cutters 12 consist of thin blades and are separated by means of spacers 18. A set screw 19, threaded into an opening formed in an end of the holder 5 is adapted to have its inner end bear against the cutters 12 and prevent any lateral movement thereof. The holder receiving the scoring blades 12 is adjustable within the opening 11 of the part 5 and is secured in the adjusted position by means of a set screw 20. Extensions 21 at the ends of the plate 14 overlap end portions of the part 5 and receive set screws 22 by means of which the scoring mechanism may be adjusted with reference to the block or holder 5 so as to have the ends of the cutters 12 project from the rotary head the proper distance.

The block from which the material is cut is indicated at 23 in Fig. 1 and is held between a series of rollers 24 and 25, said rollers being positively driven to feed the block as the shavings are cut therefrom.

The blocks 23 from which the shavings, or excelsior, are cut are usually about eighteen to twenty inches and by reason of the great diameter of the rotary cutter the shavings, or excelsior, cut from the block are parallel with the fibers of the wood, thereby insuring the formation of a product having lasting qualities, while at the same time providing a machine which is rapid in operation because of the embodiment therein of a rotary cutter. The block is continuously fed and is scored longitudinally by means of the cutters 12 and a shaving immediately removed by the cutter 9 and in order to insure a maximum output the cutters may be distributed about the rim of the rotary cutter head a distance corresponding approximately to the maximum length of block from which the material is to be cut, so that the operation is practically continuous.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In combination a block having an opening, a holder adjustable within the opening of the block and comprising two plates, one of the plates having extensions to overlap the block, set screws threaded in said extensions and engaging the block to adjust the holder in the opening thereof, one of the said plates having an edge portion recessed to form a space and having a rib projecting into said space, a plurality of cutters slipped into the space formed between the plates, each of the cutters having a recess to receive the rib, and means for securing the cutters in the holder and the latter within the opening of the block in an adjusted position.

In testimony whereof I affix my signature in presence of two witnesses.

JOSEPH H. ANDERSON.

Witnesses:
B. L. BERG,
R. L. HANNAM.

---

Copies of this patent may be obtained for five cents each, by addressing the "Commissioner of Patents, Washington, D. C."